(No Model.)
7 Sheets—Sheet 2.

H. W. DEAN.
TACKING MACHINE.

No. 418,697.    Patented Jan. 7, 1890.

WITNESSES
INVENTOR (No Model.) 7 Sheets—Sheet 3.

H. W. DEAN.
TACKING MACHINE.

No. 418,697. Patented Jan. 7, 1890.

(No Model.) 7 Sheets—Sheet 4.

H. W. DEAN.
TACKING MACHINE.

No. 418,697. Patented Jan. 7, 1890.

(No Model.)

H. W. DEAN.
TACKING MACHINE.

Patented Jan. 7, 1890.

Witnesses,
Walter H. Pumphrey
Nowell Bartlett

Inventor,
Henry W. Dean
By Johnson & Johnson
his Attorneys.

(No Model.) 7 Sheets—Sheet 6.
H. W. DEAN.
TACKING MACHINE.

No. 418,697. Patented Jan. 7, 1890.

WITNESSES
Walter H. Pumphrey.
Howell Bartle

INVENTOR
Henry W. Dean
By Johnson & Johnson
his Attorneys

United States Patent Office.

HENRY W. DEAN, OF NORRISTOWN, ASSIGNOR OF PART TO JOHN MUNDELL, OF PHILADELPHIA, PENNSYLVANIA, SIMON A. BUTLER, OF BOSTON, AND EMMA F. LOTHROP AND JOSEPH HERBERT BOWEN, BOTH OF LYNN, MASSACHUSETTS.

TACKING-MACHINE.

SPECIFICATION forming part of Letters Patent No. 418,697, dated January 7, 1890.

Application filed May 3, 1889. Serial No. 309,525. (No model.)

*To all whom it may concern:*

Be it known that I, HENRY WELLINGTON DEAN, a citizen of the United States, residing at Norristown, in the county of Montgomery and State of Pennsylvania, have invented new and useful Improvements in Tacking-Machines, of which the following is a specification.

My invention is directed to improvements in the machine for which Letters Patent of the United States were granted to me April 3, 1888, for tacking in the operation of lasting shoes, and in which a universally-movable suspended tack-driving head has its driver operated by compressed air. In such machine my improvements are directed to provisions for producing a better organization of the working parts of the machine, to facilitate the operation, and to give better and more satisfactory results in the work.

My improvements are also directed to provisions whereby the universally-movable tack-driving head is suspended in spring-balanced relation to the last, and thereby rendered more easy and convenient in handling while tacking around the edge of the upper. This provision also relieves from all strain the flexible tubes which connect the tack-driving head with the source of power, it being understood that these flexible tubes serve to convey the power from the accumulator to the tack-driver, to convey the tacks to said driver, and to exhaust the air from the driver-passage in front of the tack by the operation of the pneumatic power.

My improvements include an improved construction of the tack feeding and delivering devices, an improved construction of device for preventing the clogging of the tack-feeding raceway, an improved construction of the tack-containing hopper, an improved construction of the universally-movable tack-driving head, including its tack-detent, tack-feeding passage, tack-driver passage, and air-exhausting passage, and the valve by which the compressed air to operate the driver is controlled.

I have made improvements in the organization of the complete machine, in its construction, and in its various devices and combinations of devices, whereby the functions, separate and distinct and co-operative, are rendered effective for satisfactory work, all of which I will now describe, in connection with illustrations of such machines, preparatory to a specific designation of the devices and combinations of devices claimed as my invention.

The following is a description of the accompanying drawings, wherein is illustrated my invention embodied in its preferred form.

Fig. 5$^a$ is a vertical central section of the tack-feeding raceway shown in Fig. 4, showing its relation to the tack-let-off slide and to the device for projecting the let-off tack down into the feeding-tube by compressed air.

Referring now to the drawings, from the following description the machine therein represented will be understood as to its general construction and as to the features which constitute my invention.

The operating parts of the machine are supported in a suitable frame composed of a base-frame A, a standard B, and a swiveling head-frame C, mounted upon the latter. The base-frame part supports the cylinder D, which contains air under compression for operating the tack-driver, the air-pump E, for supplying air to the reservoir-cylinder, the operating-gear F and G for said air-pump, the driving band-wheel G', and the standard B. The standard supports and carries a horizontally-swiveling head-frame C, which supports and carries the revolving tack-containing hopper H and the tack feeding and delivering devices. The swiveling head overhangs the standard and carries a universally-movable suspended tack-driving head, which is controlled in the hands of the operator in the operation of lasting a shoe, which may be supported in a suitable lasting-machine, or upon an ordinary jack suitably supported.

Figure 5A:
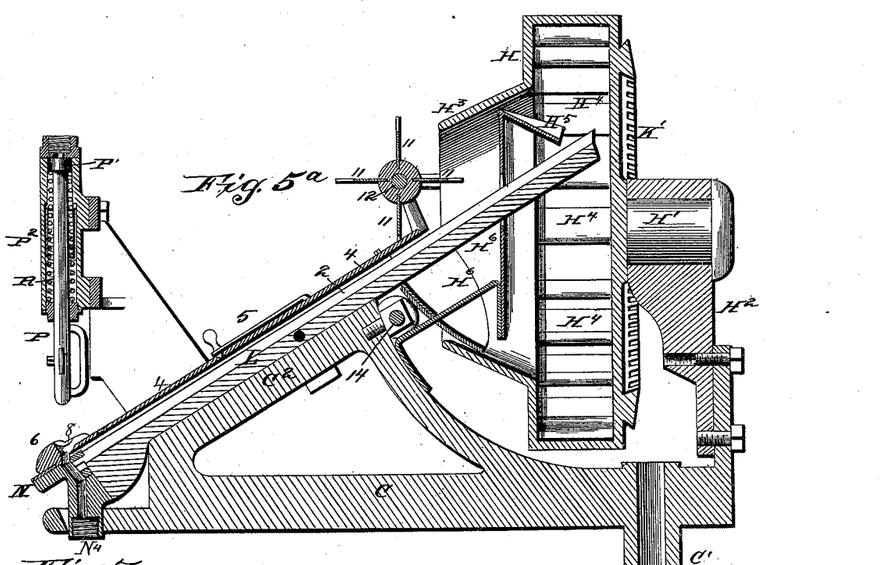

The head-supporting standard is composed of two tubular parts, one B of which is fixed to the top plate of the bed-frame and contains the inner telescoping tubular part B', upon which the head-frame is mounted and supported with freedom to be swiveled thereon by means of a tubular cylindrical bearing C', projecting downward from the under side of the head-frame. (Seen in Figs. 2 and 5ª.) This swiveling capacity of the head-frame permits the operator to turn it in the position he may desire in handling the suspended tack-driving head. The telescoping of the standard permits of the vertical adjustment of the swiveling head-frame to bring the nipple of the tack-driving head in the desired relation to the bottom of the shoe being lasted, and when such adjustment is effected it is maintained by the clamp-screw $B^2$ in the upper end of the fixed standard part. The air-pump is connected to the air-reservoir by a pipe E', and also has a suction-tube $E^2$, to be presently explained, while the compressed-air reservoir has an outlet-tube D', to be presently explained, and is also provided with a safety-valve and a gage.

Figures 1, 2, 3:
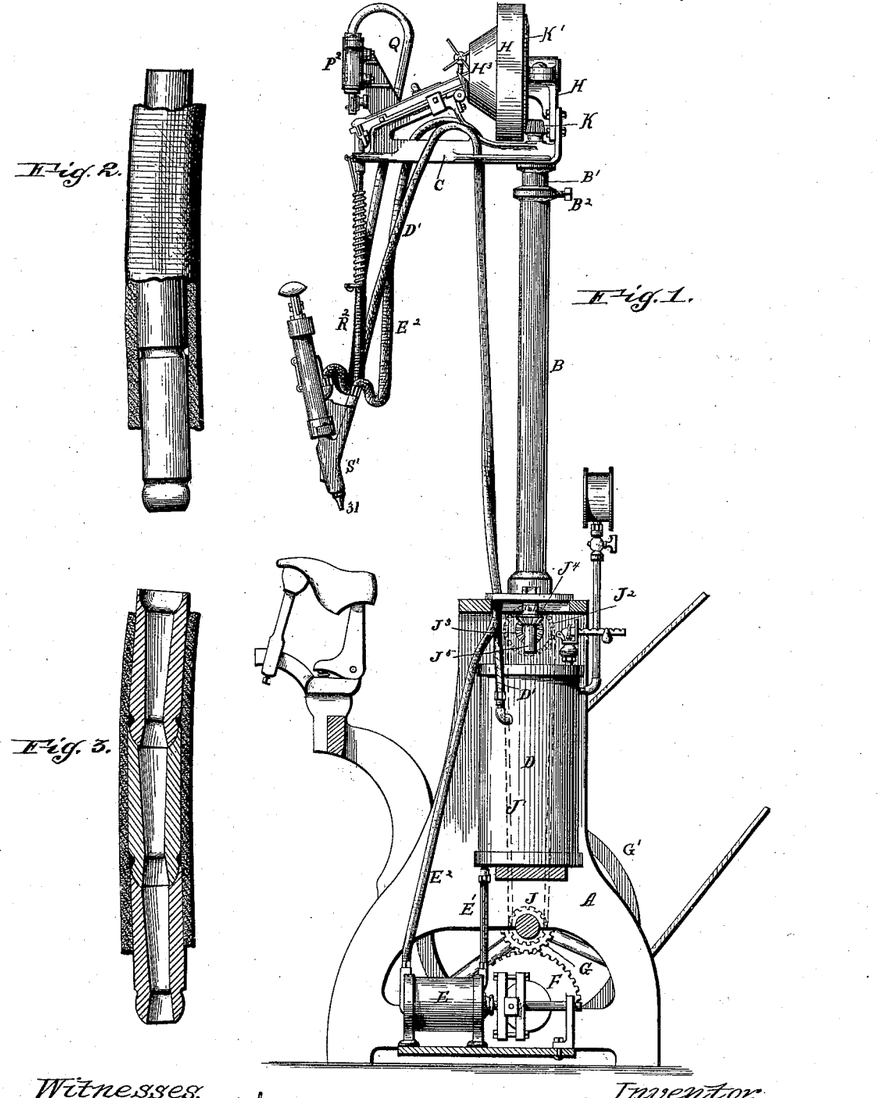
Figure 1 represents in elevation a shoe-tacking machine containing my improvements.
Fig. 2 is a partial sectional elevation of a portion of the flexible and non-collapsible tack-feeding tube.
Fig. 3 is a sectional view of the same.
Figures 4, 5:
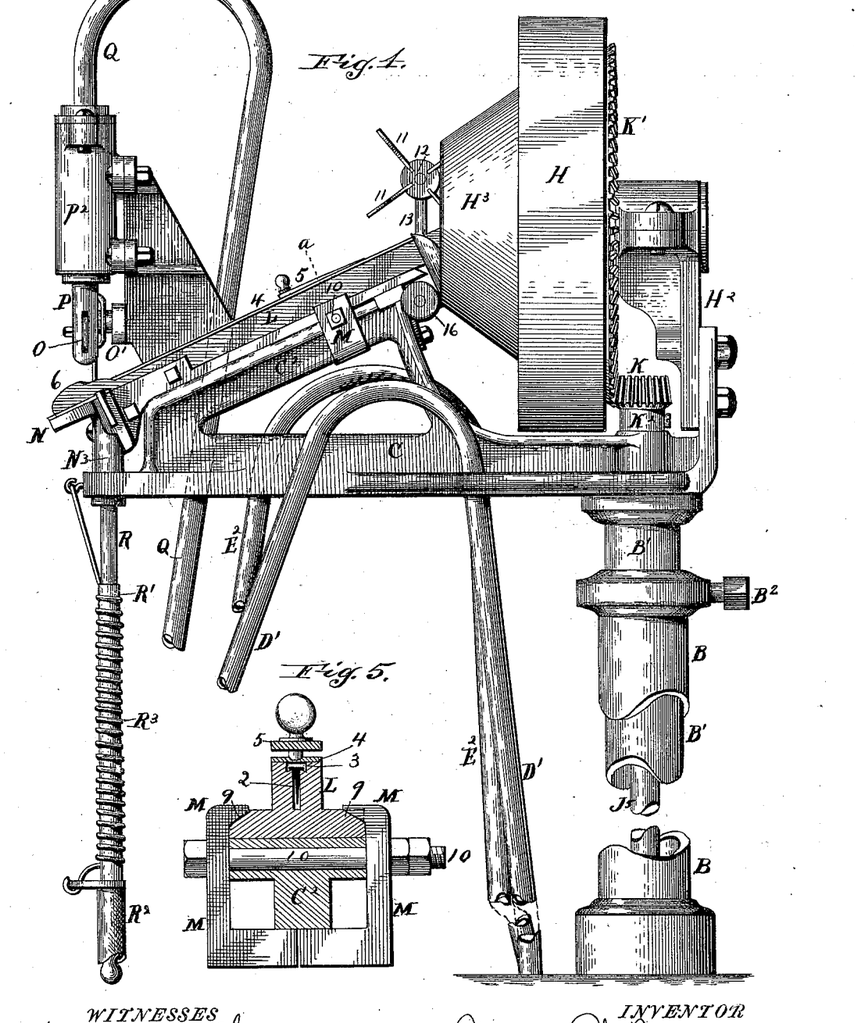
Fig. 4 is a side elevation, on an enlarged scale, of the upper or head portion of the machine and its supporting standard, including the tack-feeding devices.
Fig. 5 is a cross-section showing the tack-feeding raceway and the clamp for securing it to its seat on the head-frame, taken on the line $a$ of Fig. 4.

I provide for operating the tack-containing hopper from the shaft of the band-wheel by means of a sprocket-pinion J, from which a chain J' leads to a similar sprocket-pinion $J^2$ on a short shaft mounted in the upper part of the base-frame, and which carries also a bevel-pinion $J^3$, which engages with a bevel-pinion $J^4$, splined on the lower end of a shaft $J^5$, which passes up through the standard B and carries on its upper end a bevel-pinion K, which engages with a bevel-gear rim K', fixed on the outer closed side of the tack-containing hopper, as seen in Figs. 1 and 4. In this construction the shaft is suspended within the extensible standard by the hub $K^2$, resting on the upper side of the swiveling head-frame, while the lower end of this shaft $J^5$ extends a short distance below the pinion splined on its lower end to allow for the vertical adjustment of the swiveling head, for a purpose which I will presently state.

The tack-containing hopper H consists of a cylindrical hollow shell mounted by a short shaft H' in a standard-bearing $H^2$, rising from the head-frame at its swiveling end, and is formed on its inner side with an open central hollow truncated conical projection $H^3$, into the open truncated end of which the upper end of the inclined tack-feeding raceway extends. The inner cylindrical wall of the hopper is provided with a series of pockets $H^4$, which, as it revolves, fill and carry up tacks from a quantity which the shell always contains in its lower side, and drop them upon a trough-shaped incline H⁵ which is supported by a bracket H⁶, fixed to the head-frame, so as to stand within the conical projection of the hopper, as seen in Fig. 5ᵃ. The tacks are delivered from the trough upon the upper end of the inclined tack-feeding raceway, within which they adjust themselves so as to hang by their heads within the raceway, as shown in the detail, Fig. 29.

The tack-feeding raceway is preferably composed of a bar L, which extends from the hopper downward at an angle of about thirty degrees and terminates at the end of the head-frame just over the tack-feeding tube. A groove 2 is made in the upper side of this bar, which is open at both ends, is deeper than the length of the tack, and is made widest at its upper part 3 to suit the heads of the tacks, as seen in Fig. 5. The upper edges of the tack-feeding raceway are beveled crosswise downwardly at each side, so that the head of the tack will rest and slide down the edges, and thus render the descent perfectly free. This raceway-bar is seated upon an elevated bed part C² of the head-frame, with its upper end extended into the hopper, so that the tacks, falling in quantities down upon it, will be caught, more or less, within the groove, so that the latter will be kept filled with the tacks, which will slide down as stated, and be taken therefrom one by one by means of a let-off slide, and be delivered into the tack-feeding tube, as I will presently describe.

Figures 8, 9, 10, 11, 12, 13:
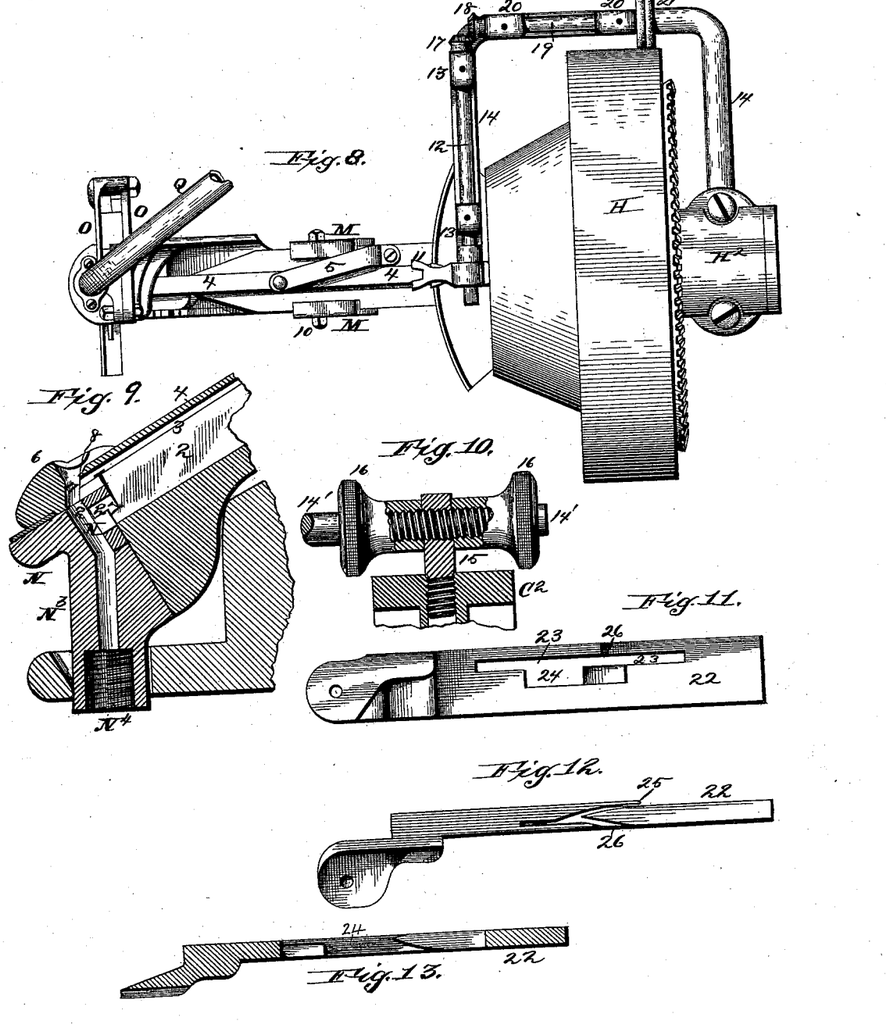
Fig. 8 is a top view of Fig. 5$^a$.
Fig. 9 is an enlarged vertical section showing the relation of the tack-feeding raceway to the let-off slide.
Fig. 10 is a sectional detail of the device for adjusting the frictional wheel of the revolving tack-clearer device in relation to the periphery of the revolving tack-containing hopper.
Figs. 11, 12, and 13 show the tack-let-off slide in side and edge views.
Figures 14, 15, 16:
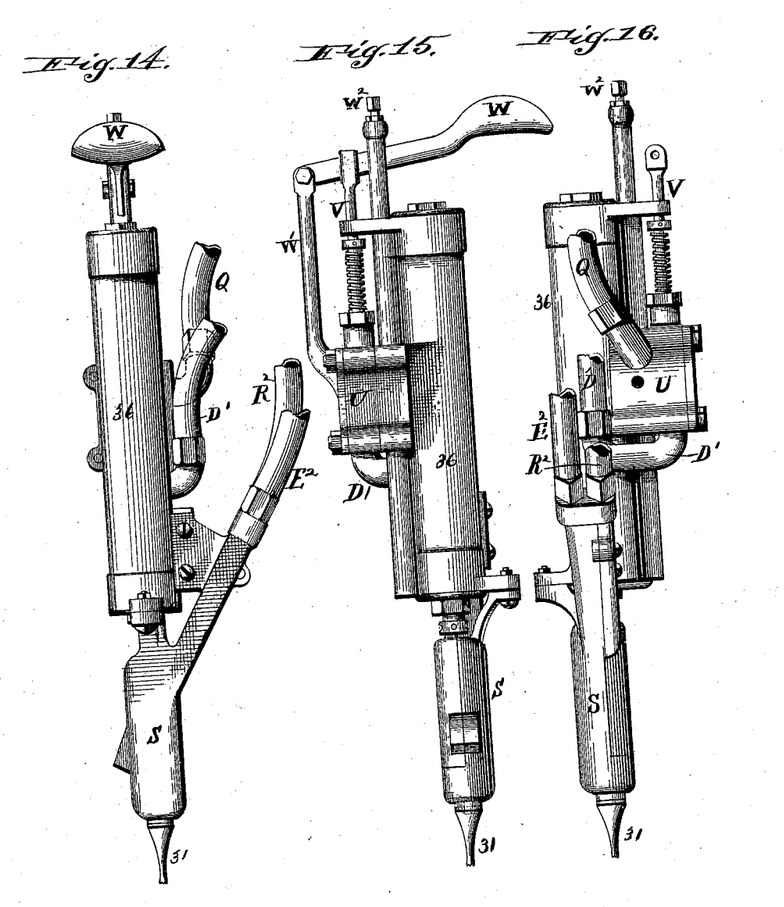
Figs. 14, 15, and 16 show, respectively, different side views of the universally-movable tack-driving head and parts of its tubular connections.
Figures 23, 24, 25, 26, 27, 28, 29, 30, 31:
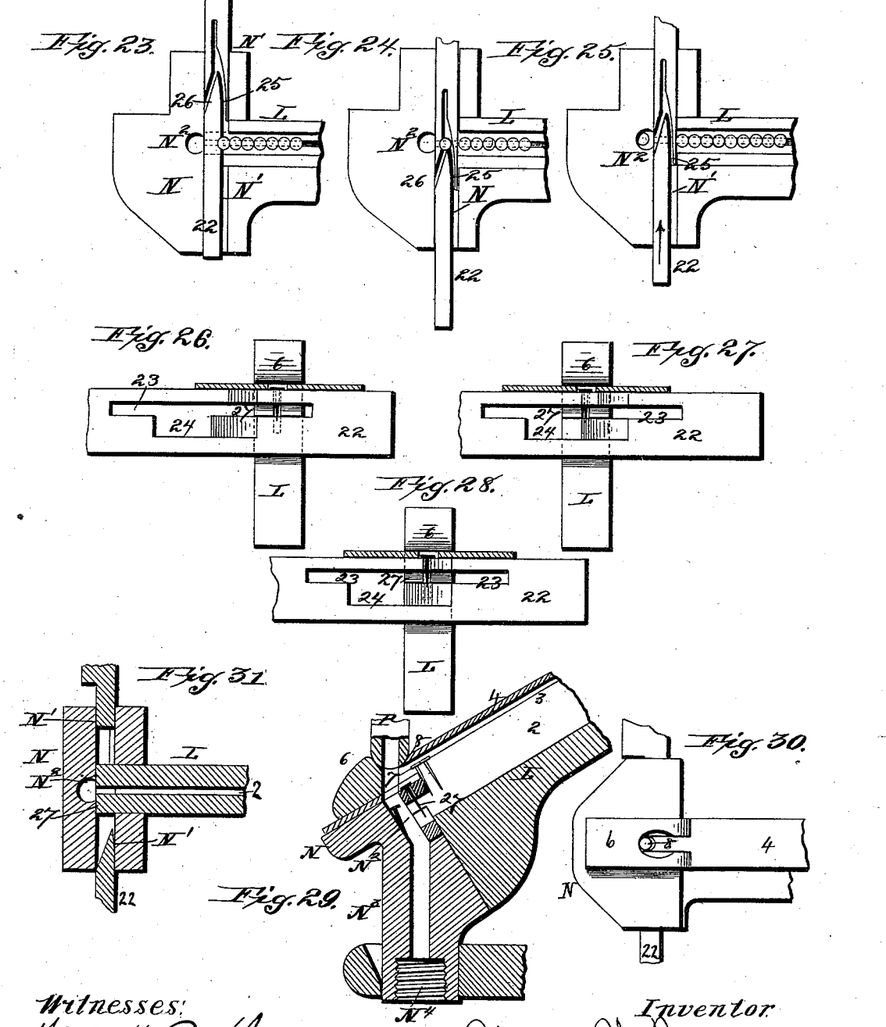
Fig. 23 shows in top view the tack-let-off slide in position to receive a tack in its transferring-slot from a line of tacks in the tack-feeding raceway.
Fig. 24 shows in top view the tack-let-off slide in position as having received the tack in its transferring-slide in suspended position.
Fig. 25 shows in top view the tack-let-off slide in position as having transferred the tack from its feeding-raceway and delivered it into the chute of the tack-feeding tube, and also showing the next succeeding tack resting against the receiving side of the slide in the feeding-raceway.
Fig. 26 shows in elevation the lower end of the tack-feeding-raceway bar, the let-off slide being in the position it occupies in Fig. 23.
Fig. 27 shows in elevation, looking at the lower end of the tack-feeding-raceway bar, the position of the let-off slide corresponding to that shown in Fig. 24, with the tack suspended at the junction of the receiving and delivering branches of the slot of the let-off slide.
Fig. 28 shows in elevation, looking at the lower end of the tack-feeding-raceway bar, the let-off slide in the position corresponding to that shown in Fig. 25, in which the tack is delivered from the slot of the slide into the chute of the tack-feeding tube.
Fig. 29 shows in vertical section the relation of the tack-feeding raceway to the let-off slide and to the device for forcing the tack by compressed air down the feeding-tube at the instant it is delivered from the let-off slide.
Fig. 30 shows in top view the lower open end of the tack-feeding raceway for receiving the device for forcing air therein above the tack.
Fig. 31 shows in horizontal section the relation of the tack-feeding raceway and its let-off slide to the chute of the tack-feeding tube.

A plate 4 covers the tackway and is held in place by a spring-arm 5, bearing upon it and pivoted to the bar, so as to be swung to one side when it is required to remove the cover-plate to examine the tackway. The upper end of the cover-plate is reduced in width, and so is the upper part of the raceway-bar L, and the raised parts that form the wide groove 3, and on which the cover-plate rests, terminate beneath the upper end of the cover-plate, and the latter at this end forms a stop over said groove, against which end of the plate a clogging tack will lodge and be displaced, as I will presently state. The lower end of the raceway-bar terminates in a swelled extension 6, having vertical opening 7, into which the tack-feeding groove terminates, and the lower end of the cover-strip is formed into a tongue 8, which extends into this opening, so as to cover the groove down to a point just above the let-off slide, leaving the vertical opening 7 open at its top, where it is so formed as to receive and form a seat for the lower end of the device for injecting air into the tack-feeding tube, as seen in Figs. 9, 29, and 30, as I shall presently state.

The tack-feeding-raceway bar is held securely upon its seat on the frame-head by means of a clamp, which consists of two angle-jaws M, (shown in Figs. 4 and 5,) one placed on each side of the head-frame seat part C², their lower L-shaped ends extending under a rib of the said seat, and their upper ends beveled and extending over and fitting upon correspondingly-beveled recesses 9 9 in the projecting sides or flanges of the raceway-bar. A screw 10, passing horizontally through the vertical arms of the clamp and through the base of the said raceway-bar, serves, by means of the lock-nuts, to clamp the said raceway-bar hard upon its seat and allow for removing it when required.

As the tacks are dropped in quantities from the hopper-buckets and from the fixed inclined trough upon the upper end of the tack-feeding-raceway bar, one or more are liable to become lodged upon the edges or set improperly within the raceway-groove, or to be caught by its head raised against the end of the cover-plate, and thereby prevent the proper feeding of the tack down the raceway-groove. I have made provision for maintaining a clear way in the groove, which I will now describe.

Just above the upper end of the raceway-bar is mounted a revolving knocking-off device, which consists of radial arms 11, slotted at their lower ends and adapted to revolve over in line with the tack-feeding way, so that the slotted arms will straddle the end of the cover-plate, and in revolving over it wipe or knock off a tack or tacks, which may have lodged against it, and throw them back into the hopper. This revolving winged wiper or knocker is mounted upon the end of a horizontal shaft 12, which is mounted in suitable standards 13 of a supporting-frame 14, adjustably connected by means of an arm 14′ to the head-frame part C² by a bracket-bearing 15, Fig. 10, through an opening in which the screw-threaded end of said frame-arm 14′ passes, and is therein and thereto firmly clamped by means of two sleeve-screws 16 16, having thumb or milled heads and placed upon the screw-threaded end of said frame, one on each side of said supporting-bracket. A bevel-pinion 17 on the opposite end of the wiper-shaft 12 engages with a bevel-pinion 18 on a counter-shaft 19, supported upon said adjustable frame 14 by separate standards 20, parallel with the periphery of the revolving tack-containing hopper, and carrying on its other end a friction-wheel 21, which is maintained in contact with the circumference of said revolving hopper with sufficient pressure to cause the rotation of the winged wiper by the rotation of said hopper. It is to maintain such proper pressure upon the friction-wheel that I provide for adjusting the frame 14, which supports the connecting-shafts 12 and 19, so as to carry said friction-wheel toward or from the periphery of said hopper. In making this adjustment, the winged wiper or knocker will be adjusted upon its shaft so that its slotted wings will revolve over and in exact line with the upper end of the tack-feeding-raceway bar. The supporting-frame 14 for this frictionallydriven wiper or knocker device is pivotally connected to the bearing-standard H² of the revolving hopper, so as to support said frame and permit of its adjustment, as stated. Suitably secured to the lower end of the tack-feeding raceway is an irregularly-shaped plate N, having a horizontal guideway N', open at the top and at each end, and standing at right angles to the tack-feeding-raceway bar, which crosses said guideway and opens into a chute N², formed in the wall of the guideway, so as to open into the side of the latter, as seen in Figs. 29 and 31. The chute opens into a lower vertical open way formed in a tubular extension N³, which projects downward from said guideway-plate and terminates in a screw-socket N⁴, within which is secured the upper end of the tack-feeding tube, which I shall presently describe. Into this guideway is closely fitted the tack-let-off slide 22, which exactly fits the depth and width of the guideway, which has a depth greater than the tack-feeding raceway, as will be seen by referring to Figs. 9 and 29.

The let-off slide has a face longitudinal slot 23, which opens at its sides and is made wider at 24 for a portion of its length, as seen in Fig. 11. That part above the said face-slot 23, and which constitutes the upper edge of the slide, is formed with a slot somewhat like the letter V, standing in the length of said slide and opening at its upper edge and at its under side into the said face-slot, as seen in Fig. 12. One branch 25 of this edge slot opens at that side of the slide which is next to the tack-containing hopper, while the other branch 26 of this edge slot opens at that side of the slide which joins that side of the guideway-wall into which the tack-chute N² opens, as seen in Fig. 25. This slot is just wide enough to receive one tack at the side of the slide against which the line of tacks rest suspended in the raceway, as seen in Figs. 23 and 25. In the latter figure the slide is in position to support the line of tacks against the arm which forms the slot 25, and when moved in the direction of the arrow in said figure carries the said arm past the line of tacks and brings one of the line in position to be received into said slot, as seen in Figs. 23 and 24. The reverse movement of the slide carries the tack out of the slot 26 on the other side of the slide and delivers it into the chute N², as seen in Fig. 25. In this operation two things co-operate with the slide to take from the line of tacks in the raceway one at a time and deliver it as stated—that is to say, the tacks descending the inclined raceway by their gravity cross one at a time the slide within its slot by the same force, first resting against the receiving side of the slide, then against the lower side of the edge slot in every movement of the slide till the tack drops out at the opposite side of the latter, and in this receiving and delivering movement of the slide the lower part of the tack is maintained within the tack-feeding raceway by a narrow flange-like projection 27 from the end of the raceway-bar, exactly fitting into the upper part of the face-slot 23 of the slide and just equal to the thickness of said slide, whereby the tack-feeding raceway 2 is extended across the slide, so as to open into the chute N², as seen in Figs. 9, 31, and 29. In this way the tacks cross the slide while being held within the raceway and suspended by their heads. In effecting this operation the slide is moved in harmony with the operation of tacking by means which I will now describe.

Figures 6, 7:
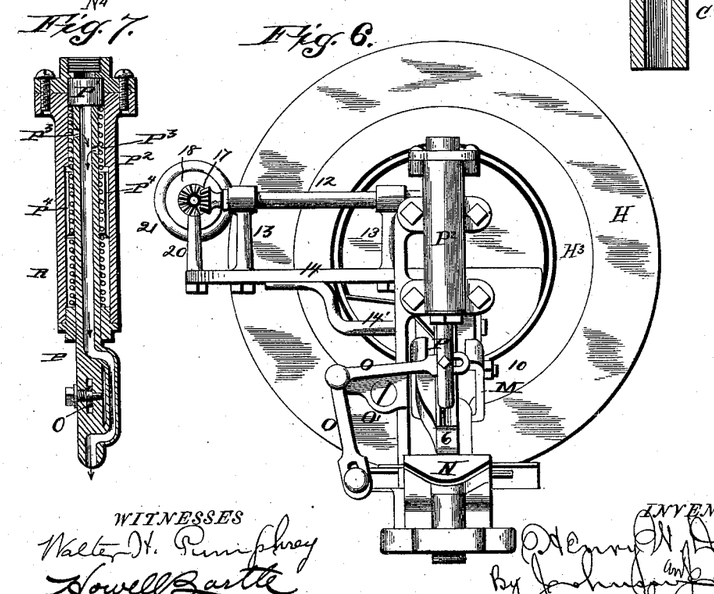
Fig. 6 is a front elevation of Fig 5$^a$.
Fig. 7 is a vertical section of the device for projecting the let-off tack down the tack-feeding tube by compressed air.

To one end of the slide is connected one arm of a bell-crank lever O, which is pivoted to a bracket O' on the head-frame, the other arm being pivoted to the lower end of a vertically-moving piston-rod P, the said lever-connections being made by screw-pivots having anti-friction ring-rolls fitted in the slots of the lever ends, whereby the said slide is operated by the said piston-rod, as I will now describe. The piston P' of this rod operates within a cylinder P², supported vertically upon the head-frame, and the piston-rod P is tubular and has openings P³ a little below the piston, which communicate with the cylinder when the piston has been forced down to the limit of its movement. For this purpose the piston moves in a closely-fitting air-tight portion of the cylinder for a portion of its stroke, and then enters a portion of the cylinder provided with several guide-ribs P⁴, which form open wall-channels, and allow the air under compression, and by which the piston had been depressed, to pass below the piston into the lower larger part of the cylinder, and thence into and through the hollow piston-rod. In this position of the piston-rod its open rounded end is seated in the socket end of the opening 7 at the terminus of the tack-raceway just above the feed-chute, so that the air entering the top of the cylinder through the flexible tube Q from the exhaust of a D-valve, having first driven down the tubular piston-rod so as to close its socket-seat, as in Fig. 29, then acts instantly through said rod to aid in driving down the tack which has been delivered from the slide within the chute. The means for providing the air for this purpose will be presently described. A spiral spring R, placed within the cylinder P², serves to return the piston P' to its normal condition, as seen in Figs. 5ª and 7. This upward movement of the piston is limited by striking against an interior collar at the upper end of the cylinder, and thus limit the inward movement of the slide, while the seating of the piston-rod in its socket-seat, as seen in Fig. 29, limits the outward movement of the slide, so that there is no striking or concussion of the slide upon any part of the tack-feeding devices.

The tack-feeding tube is air-tight, and is secured to and hangs from the lower end of the tubular projection N⁴ of the slide-guideway. That portion R of this tube which connects with said tubular projection is of metal, and is screwed into the metal socket of said projection and telescopes with an outer tubular metal section R', to the lower end of which is secured the upper end of the flexible tubular section R², to the lower end of which is secured the tack-driving head and by which the latter is supported. The flexible section R² of the tube is connected at its upper end with a coil-spring R³, which connects with the head-frame, whereby the tack-driving head is suspended in balanced relation to the last, and can be pulled down, with its telescoping tube, against the tension of the spring. This construction permits the tack-driving head to be moved and handled with perfect freedom, and at the same time relieves the flexible tack-conveying tube and the air-conveying tubes of all strain. In my said patent these flexible tubes were relieved from the weight of the tack-driving head by means of a chain which is somewhat shorter than the connected tubes; but such chain connection will not give the advantage of the suspending-spring which permits the tack-driving head to be supported in balanced relation to the said tubes and to be easily pulled down to present its nozzle upon the shoe-upper at the point where the tack is to be driven. The flexible portion of the tack-feeding tube is provided with a metallic lining composed of tubular sections joined together in such manner as to permit flexure, each section having its interior or passage so formed as to center the tack in passing the joint to prevent them catching upon the walls and to render the tube non-collapsible under the action of a vacuum produced therein to aid the swift descent of the tack. As the construction of this non-collapsible tack-feeding tube forms the subject-matter of a separate and distinct application for a patent, filed by me of even date herewith, it is deemed unnecessary to give herein a more particular description thereof, further than to state that the tack will have a perfectly free course through the tube under all conditions of its use in handling the driver-head, and that it is protected from undue air-pressure from within and from collapsing when the air is sucked out.

The tack-driving head is composed of a tubular hand part S, by which it is grasped and controlled in the operation of tacking, and which contains the tack-passage, the tack-driver passage, the detent for the tack, and a passage for exhausting the air from the tack-driver passage, and is surmounted by a tack-driving device operated by compressed air by mechanism controlled by the hand of the operator, as I will now describe.

Figures 17, 18, 19, 20, 21, 22:
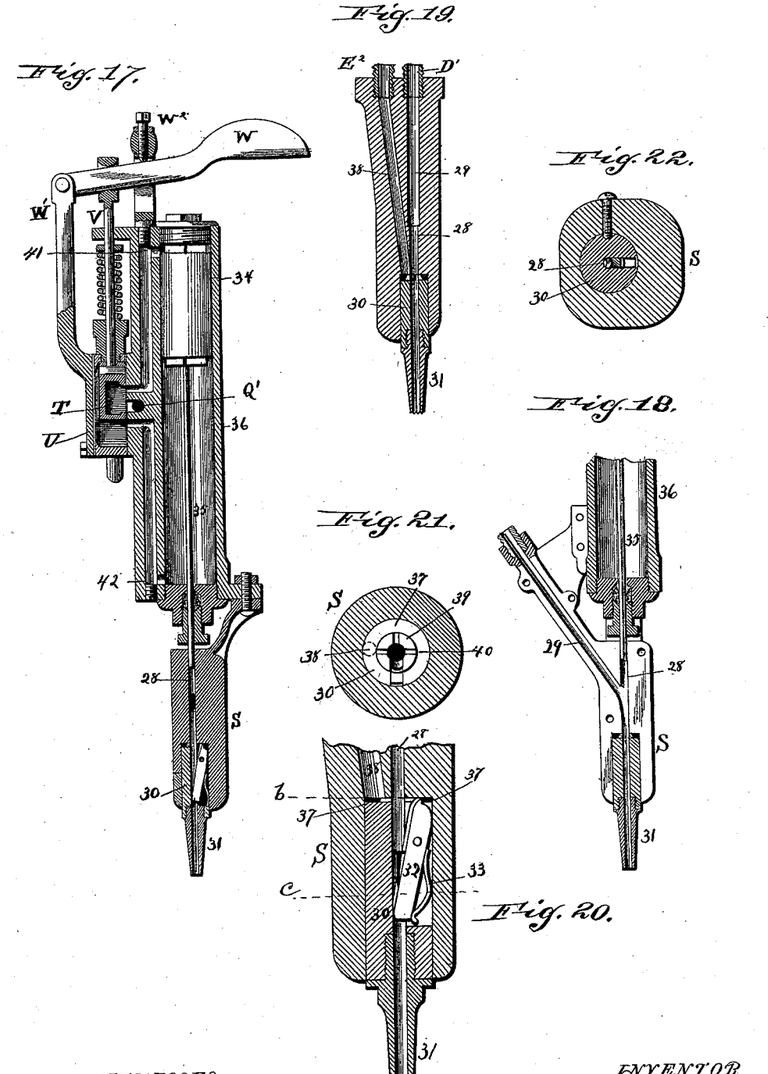
Fig. 17 is a vertical central section of the tack-driving head.
Fig. 18 is a vertical central section of part of the tack-driving head, showing the tack-passage junction with the tack-driver passage.
Fig. 19 is a vertical central section of the hand-holding part of the tack-driving head, showing the junction of the tack-driver passage, the tack-feeding passage, and the air-exhaust passage.
Fig. 20 is an enlarged vertical sectional view of the hand-holding part of the tack-driving head, showing the tack-detent in the driver-passage.
Fig. 21 is a horizontal section taken on the line $b$ of Fig. 20.
Fig. 22 is a similar section taken on the line $c$ of Fig. 20.

The tubular hand part S of the tack-driving head has a central passage 28, which forms the tack-driver passage and a continuation of the tack-feeding passage 29, which is formed in an oblique projection of the hand part, so as to form a junction with the tack-driver passage at a point just below the lower end of the tack-driver when the latter is at its highest point, as seen in Fig. 18. The tack-driver passage extends through a plug 30, which is inserted and secured in an opening in the lower end of the hand part, and the said passage also extends through a nipple 31, screwed into the lower end of the said hand part. This nipple part is placed at the point of the shoe-upper at which the tack is to be driven, and it is serrated at its end to prevent its slipping when placed upon the upper. The plug 30 is below the junction of the tack feeding and driver passages, and has a detent 32 pivoted within its passage, which, by means of a spring 33, is maintained in position at its lower end across the tack-driver passage, so as to close said passage and to hold the tack in position to receive the blow of the driver, as seen in Fig. 20. This detent is fitted within a vertical recess in the wall of the driver-passage, and when the tack is driven yields within the recess to let the tack and the driver pass. The driver consists of a piston 34, having a rod 35, and works in a cylinder 36, mounted upon a bracket of the said tubular hand part, and the piston is operated by compressed air, as I shall presently describe.

At the upper end of the detent-containing plug 30 there is an annular space 37, which communicates with the tack-driver passage 28 below its junction with the tack-feeding passage. This annular space also communicates with an oblique passage 38, as seen in Figs. 19 and 20, through which the air is sucked from the driver-passage 28, and hence from the tack-feeding tube and passage 29, which thereby forms a vacuum within the said feed-passage in front of the tack to aid its descent. This sucking of the air from the tack-feeding passage in front of the tack is effected by the flexible tube E², which connects with the air-pump, as seen in Fig. 1, and it is through this tube that the pump is supplied with air to supply the reservoir.

Referring to Figs. 20 and 21, it will be seen that the exhaust communication between the tack-driver passage and the exhaust-passage is made by a central projection 39 of the upper end of the detent-containing plug 30, having radial grooves 40, so that at this point the joint in the wall of the tack-driver passage will be unbroken and the catching of the tacks at this point is prevented. The detent 32 is a flat piece of metal, and its thickness is equal to the diameter of the driver-passage 28, so that when it obstructs the driver-passage, as in Fig. 20, the latter is thereby rendered air-tight from below in order that the air may be exhausted from the lower part of the tack-passage through the flexible tube E², while from above the driver-passage is rendered air-tight by the driver 35 itself, which always closes the upper end of the said passage, as seen in Figs. 17 and 18, so that the air can only be sucked down from the tack-feeding tube. In my said patent the driver-passage is closed at its upper end by a spring-controlled plug and at its lower end by a spring-controlled pivoted valve, and thereby renders the driver-passage air-tight in order that the air may be exhausted from the tack-passage in the head, so that the tack may descend freely into the driver-passage. By my present improvement this top spring-controlled plug is dispensed with, and I also dispense with the tack-let-off device which is placed in the tack-passage adjacent to the driver-passage in my said patent. My present improvement also dispenses with the thumb-piece and its lever-connections for operating this tack-let-off device of the tack-driving head. In my present improvement the tack-driver is arranged to perpetually close the top of the driver-passage. In my said patent the air is exhausted from the driver-passage and from the lower end of the tack-conveying tube by means of perforations in the driver-passage wall, whereas by my present improvement this exhaust provision is made by a separate plug forming an annular chamber around the driver-passage and which communicates with the exhaust-tube. This plug also serves to contain the tack-detent, and thus avoids the objection to the wall-perforations and to the externally-placed tack-detent in my said patent. The head-frame from which the universally-movable tack-driving head is suspended is free to be moved horizontally with said tack-driving head, and this permits of an easier manipulation of said suspended head, and the two parts are thereby rendered independently movable as well as movable together, which gives important advantages over the fixed head-frame used in my said patent, in this, that it permits the head-frame to be swung horizontally in the direction in which the suspended tack-driving head is swung and by simply pulling upon the suspending spring.

The air under compression is taken from the reservoir to operate the tack-driver by the flexible tube D', by means of a valve T, controlled by the hand, as I shall now describe.

The tack-driver 35 passes through a stuffing-box at the lower end of the cylinder, and is long enough to extend into and close the driver-passage when the piston is at the limit of its upstroke. Air under compression is admitted into the cylinder through ports 41 42 at each end thereof by means of a D-valve T, working in a valve-chest U on the side of the cylinder, and which connects with the flexible tube D' from the air-reservoir. In Fig. 17 the piston is shown held up on its upstroke by the air entering its lower port 42 from the valve-chest, while the air from above the piston had passed out through the chamber of the valve and the exhaust-port Q', through the flexible tube Q, into the top of the cylinder $P^2$, to drive the piston down and escape through the hollow piston P into the tack-feeding tube to aid the descent of the tack. The stem V of the D-valve is connected to a lever W, which is fulcrumed on a bracket W', rising from the valve-chest, and the valve and its lever are constantly forced up against an adjustable stop $W^2$ to maintain the tack-driver up in its position to drive the tack. The operator, holding the tack-driving head in his hands, places the nipple 31 at the point he wishes to drive the tack and, depressing the lever, operates the valve, so that the compressed air from the valve-chest enters the cylinder above the piston 34 and instantly drives the tack which had been fed down into the driver-passage. This operation is repeated just as quick as the operator can change the position of the tack-driving head from one point to another around the edge of the upper, and the operation of the tack-let-off slide and of the tack-driver being so timed that a tack will always be fed in position to receive the driver by the action of air under pressure let out at intervals by simply depressing the thumb-lever W to move the D-valve of the universally-movable tack-driving head suspended in spring-balanced relation to the shoe to be lasted.

I claim as my improvement—

1. In a tacking-machine for lasting shoes, the following instrumentalities co-operating in the operation of tacking the inner sole to the upper: a swiveling head-frame carrying tack-feeding mechanism, a universally-movable tack-driving head having a valve-controlled driver, flexible tubes for conveying the tacks and the motive power to drive them, an extensible tubular coupling for the tack-conveying tube, a coiled spring which connects and suspends said tack-driving head from said swiveling head-frame, and a lever for controlling the driver-operating valve, substantially as described.

2. In a tacking-machine for lasting shoes, the combination of a head-frame carrying tack-feeding mechanism, with a universally-movable tack-driving head, a flexible tack-conveying tube connected with said feed mechanism, and a coiled spring suspending said tack-driving head from said head-frame, substantially as described.

3. In a tacking-machine for lasting shoes the combination, with a suspended universally-movable tack-driving head and suitable tack-feeding mechanism therefor, of a flexible extensible tack-conveying tube connecting said tack-driving head with the tack-feeding mechanism, and a coiled spring which both supports and balances said tack-driving head, whereby the tube is rendered extensible within certain limits in manipulating the tack-driving head.

4. In a tacking-machine for lasting shoes, the combination of a vertically-extensible standard or support, a head-frame having a swiveling connection with said standard and carrying tack-feeding mechanism, a suspended universally-movable tack-driving head, and a coiled spring connected with and depending from said swiveled head-frame, and which both supports and balances said tack-driving head, substantially as described.

5. In a tacking-machine for lasting shoes, the combination, with a head-frame carrying tack-feeding mechanism and a universally-movable tack-driving head, of a tack-conveying tube having a flexible connection with said tack-driving head and a rigid extensible telescoping connection with said head-frame, substantially as described.

6. In a tacking-machine for lasting shoes, the combination, with a head-frame carrying tack-feeding mechanism and having a tack-conveying tube connected with said feeding mechanism, of a universally-movable tack-driving head having both a flexible and an extensible tubular connection with said tack-conveying tube, and a coiled spring which suspends said tack-driving head from said head-frame, substantially as described.

7. In a tacking-machine for lasting shoes, the combination, with a universally-movable tack-driving head and a swiveling head-frame carrying tack-feeding mechanism, of a flexible tack-conveying tube, a coiled spring which both suspends and balances said tack-driving head, and flexible tubes for connecting said tack-driving head with the motive power for driving the tack, substantially as described.

8. In a machine for driving tacks for lasting shoes, the combination, with a tack-feeding mechanism and a universally-movable tack-driving head, of a flexible tack-conveying tube supporting said head, a telescoping coupling-tube between said feeding mechanism and said tack-conveying tube, and a coiled spring secured to said tack-feeding mechanism and to said flexible tack-conveying tube, substantially as described.

9. In a tack-driving machine, the combination, with a base-frame and vertically-extensible telescoping standard thereon, of a head-frame carrying tacking and driving mechanism, and means for supplying the tacks, consisting of a tack-containing revolving hopper, a shaft mounted within said extensible standard, having a bevel-pinion on each end, a rim-wheel K' on said tack-containing hopper, a bevel-pinion $J^3$, mounted in said base-frame, and suitable means for operating the latter pinion, substantially as described.

10. In a tack-driving-machine, the combination, with a base-frame, a vertically-extensible telescoping standard thereon, a head-frame, tack-feeding mechanism mounted thereon, and a universally-movable tack-driving head suspended from said head-frame, of a revolving tack-containing hopper having a face gear-rim K', a shaft mounted within said telescoping standard and having the top pinion K and the pinion $J^4$, splined on its lower end, and the pinion $J^3$, mounted in said base-frame, substantially as described.

11. In a tack-driving machine, the combination of a cylindrical revolving hopper having an open projection upon one head, an inclined tack-feeding raceway having a feeding-groove for the tacks and extending into said hopper projection, a plate covering said groove, and a revolving wiper having arms adapted to sweep close to said plate and raceway, and suitable mechanism for feeding and driving the tacks, substantially as described.

12. In a tack-driving machine, the combination of a cylindrical revolving hopper having an open projection upon one head, an inclined tack-feeding raceway having a feeding-groove for the passage of the tacks and extending into said projection, a plate covering said groove, and a revolving wiper having radial arms slotted at their ends to straddle said raceway and arranged above said raceway at the upper end of said covering-plate, and suitable mechanism for feeding and driving the tacks, substantially as described.

13. In a tack-driving machine, the combination of a cylindrical revolving hopper, an inclined tack-feeding raceway projecting into the open head of said hopper, a revolving shaft journaled above said raceway and provided with a wiper at one end and a pinion at the other end, and a counter shaft journaled parallel to said hopper and provided with a pinion at one end meshing with said pinion and having a friction-wheel bearing against the periphery of said hopper, and suitable mechanism for feeding and driving the tacks, substantially as described.

14. In a tack-driving machine, the combination of a revolving hopper, an inclined tack-feeding raceway projecting into the open head of said hopper, a laterally-adjustable supporting-frame having bearings at a right angle to the axis of said hopper, a shaft journaled in said bearings and provided with a revolving wiper above said raceway and with a pinion 17 at the outer end, and a counter-shaft 19, journaled in bearings in said frame, provided with a pinion 18, meshing with said pinion 17, and having a friction-wheel 21 upon said shaft bearing against the periphery of said hopper, substantially as described.

15. In a tack-driving machine, the combination of a frame or support C, a revolving hopper, an inclined tack-feeding raceway projecting into the open head of said hopper, a bracket-bearing $C^2$ upon the under side of said raceway, a supporting-frame 14, having one end pivoted to said frame or support C, its other end screw-threaded and fitted through said bracket-bearing $C^2$ and having bearings parallel with and at right angles to said hopper, clamping-nuts 16 upon said screw-threaded end at both sides of said bracket-bearing, a shaft 12, journaled in said bearings at right angles to said hopper, having a revolving wiper above said raceway and a pinion 17 at one end, and a counter-shaft 19, journaled in said bearings parallel to said hopper and provided with a pinion 18, meshing with said pinion 17, and having a friction-wheel bearing against the periphery of said hopper, substantially as described.

16. In a tack-driving machine, the combination of a head-frame having an elevated and inclined bed part C², a grooved tack-feeding-raceway bar L, two angle-jaws M, having their lower L-shaped ends extending under said bed part and having their upper ends clamping said bar to said bed part, and a screw 10, passed through said angle-jaws and bed part, and suitable mechanism for feeding and driving the tacks, substantially as described, for the purpose stated.

17. In a tack-driving machine, the combination of an inclined tack-feeding raceway, a plate N at the lower end of said raceway, formed with a horizontal guideway intersecting said raceway at right angles, and having a vertical intersecting chute, with a reciprocating let-off slide having a V-shaped slot in its upper edge opening at each side of middle of said slide and into an opening at the middle of said slide, and suitable mechanism for feeding and driving the tacks, substantially as described.

18. In a tack-driving machine, the combination of an inclined tack-feeding raceway having a longitudinal slot for the passage of the tacks and terminating in a flange-like projection 27 at its lower end, a plate N, arranged at the lower end of said raceway, formed with a vertical chute, and a horizontal guideway intersecting said raceway and having said flange-like projection extending across said guideway, with a reciprocating let-off slide formed with a longitudinal side slot for said flange-like projection and with a forked or V-shaped slot having its branches opening at the sides of said slide, and suitable mechanism for feeding and driving the tacks, substantially as described.

19. In a tack-driving machine, the combination of the inclined tack-feeding raceway L, the plate N, having the horizontal guideway N', the chute N², and a seat 7 at the upper end of said chute, with the let-off slide 22, having the face-slot 23 24 and the forked-edge slot 25 26, the reciprocating piston, and piston-rod P' P, having its lower end adapted to fit into the seat 7 of the tack-chute N² and having a passage for compressed air, means for reciprocating said slide 22 from said piston-rod, and the tack-feeding tube, substantially as described.

20. In a machine for driving tacks, the combination, with a gravity tack-feeding raceway and a tack-delivering tube, of a let-off slide having communicating face and edge slots 23, 25, and 26, and a guide for said slide, having a tack-chute N², the said tack-feeding-raceway bar having a tongue or flange projection 27, extending through the said face-slot 23 of the slide and opening into the said chute, substantially as described, for the purpose specified.

21. In a machine for driving tacks, the combination, with an inclined tack-feeding-raceway bar having an end flange or projection through which the tack-raceway 2 extends, of a slide having a face-slot 23 and a V-shaped-edge slot 25 and 26, opening at the opposite sides of the slides and communicating with the said face-slot and with the said tack-raceway, substantially as described.

22. In a tacking-machine for lasting shoes, a universally-movable tack-driving head having a nozzled hand part provided with a central passage, a spring-detent inclosed within the body of said hand part and closing the lower part of said passage, a tack-driver arranged within and perpetually closing the upper part of said passage, a tack-feeding passage, and an air-exhausting passage, in combination with the tack-driving device surmounting said hand part, and the flexible tubes conveying the power for operating said driver, substantially as described.

23. In a tacking-machine for lasting shoes, the combination of an inclined tack-feeding raceway having a covering-plate, with a revolving tack-containing hopper, a winged tack-knocking-off device arranged to revolve in the line of said raceway and operated by said hopper, and suitable tack-driving mechanism connected with said raceway, substantially as described.

24. In a tack-driving machine, the combination of a universally-movable tack-driving head formed with a central passage 28, an inclined tack-feeding passage 29, entering said central passage, an opening in the lower end of said head, and an air-exhaust passage 38, opening into the bottom of said opening, a plug 30, fitted and secured into said opening, and formed with a central passage, and with radiating grooves in its upper end and forming an annular space 37 around said grooves, a yielding valve in the central passage of said plug, and a reciprocating tack-driving plunger in said central passage and closing the upper end of the same, substantially as described.

25. In a tack-driving machine, the combination, with a hand part having a central passage and tack-feeding and air-exhaust passages, of a cylinder above said hand part and formed with channels and ports at its ends, a piston reciprocating in said cylinder and provided with a tack-driving plunger-rod which slides in the central passage of said hand part, a valve-chest upon said cylinder, a sliding D-valve within said chest and provided with an upwardly-extending stem, a thumb-lever fulcrumed upon said valve-chest and pivotally connected to said stem, a coiled spring around said stem, and an adjustable stop for limiting the upward throw of said thumb-lever, substantially as described.

26. In a tack-driving machine, the combination of the hand part S, formed with the central passage 28, the tack-feeding passage 29, the opening in the lower end and the air-exhaust passage 38, extending to said opening, the plug 30, secured in said opening and formed with radiating grooves in its upper end and a recess in its central passage, a spring-actuated valve in said recess closing said central passage, a nipple secured in the lower end of said plug, and a reciprocating tack-driving plunger in said central passage and closing the upper end of the same, substantially as described.

In testimony whereof I have hereunto set my hand in the presence of two subscribing witnesses.

HENRY W. DEAN.

Witnesses:
  A. E. H. JOHNSON,
  JAMES MUNDELL.